United States Patent
Osawa (10) Patent No.: US 8,629,934 B2
(45) Date of Patent: Jan. 14, 2014

(54) IMAGING APPARATUS AND METHOD FOR CONTROLLING THE SAME

(75) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/232,865

(22) Filed: Sep. 14, 2011

(65) Prior Publication Data

US 2012/0069240 A1 Mar. 22, 2012

(30) Foreign Application Priority Data

Sep. 17, 2010 (JP) ................................. 2010-209320

(51) Int. Cl.
*H04N 5/222* (2006.01)
(52) U.S. Cl.
USPC ............................ 348/371; 348/370; 348/366
(58) Field of Classification Search
USPC ............ 348/370, 371, 362, 364, 366; 396/61, 396/165
See application file for complete search history.

(56) References Cited

U.S. PATENT DOCUMENTS

| | | | |
|---|---|---|---|
| 5,666,571 A * | 9/1997 | Matsumura | 396/165 |
| 6,240,252 B1 | 5/2001 | Yamaguchi et al. | |
| 6,426,775 B1 | 7/2002 | Kurokawa | |
| 6,859,618 B1 | 2/2005 | Yip | |
| 7,706,674 B2 * | 4/2010 | Sugimoto et al. | 396/61 |
| 2004/0150743 A1 * | 8/2004 | Schinner | 348/371 |
| 2005/0213957 A1 | 9/2005 | Tokunaga | |
| 2008/0080851 A1 * | 4/2008 | Endo | 396/157 |

FOREIGN PATENT DOCUMENTS

| | | |
|---|---|---|
| EP | 2317380 A1 | 5/2011 |
| JP | 2005-181355 A | 7/2005 |
| JP | 2005-204120 A | 7/2005 |
| JP | 2007-025558 A | 2/2007 |

\* cited by examiner

*Primary Examiner* — Sinh Tran
*Assistant Examiner* — Zhenzhen Wu
(74) *Attorney, Agent, or Firm* — Canon USA Inc. IP Division (57) ABSTRACT

Information relating to object distances in a plurality of areas in an imaging plane is acquired, and a threshold value for an object luminance at which imaging is performed by flashing an illumination device according to a difference between an object distance in a reference area and the object distances in the plurality of areas.

10 Claims, 10 Drawing Sheets

| PD1 | PD2 | PD3 | PD4 | PD5 | PD6 | PD7 |
| --- | --- | --- | --- | --- | --- | --- |
| PD8 | PD9 | PD10 | PD11 | PD12 | PD13 | PD14 |
| PD15 | PD16 | PD17 | PD18 | PD19 | PD20 | PD21 |
| PD22 | PD23 | PD24 | PD25 | PD26 | PD27 | PD28 |
| PD29 | PD30 | PD31 | PD32 | PD33 | PD34 | PD35 |

IMAGING APPARATUS AND METHOD FOR CONTROLLING THE SAME

BACKGROUND OF THE INVENTION

1. Field of the Invention

The present invention relates to an imaging apparatus, and more particularly, to flash control in flash imaging.

2. Description of the Related Art

In a conventional imaging apparatus, in order to perform successful imaging, an object is generally illuminated with an auxiliary light source such as an illumination device (flash device) when the luminance of the object (hereafter referred to as "object luminance") is low. A technique for performing automatic flash control of the auxiliary light source, such as a flash device, according to an imaging condition, such as the object luminance, is also known.

For example, Japanese Patent Application Laid-Open No. 2005-204120 discuses a technique for performing gain (sensitivity) control of an imaging apparatus and automatic flash control of a flash unit according to an object luminance. Japanese Patent Application Laid-Open No. 2005-181355 discusses a technique for obtaining information relating to a, so-called, depth of an object (an object distance) from a focus detection result of a focus detection unit having a plurality of focus detection points when flash imaging is performed, to control a shutter speed at the time of the flash imaging.

In the technique discussed in Japanese Patent Application Laid-Open No. 2005-204120, imaging is performed with the imaging gain set low when the object luminance is sufficiently high, and is raised and is maintained, so that a shutter speed takes a predetermined value, when the object luminance is low and the shutter speed takes the predetermined value or less if the imaging gain remains low. When the object luminance becomes lower, so that the required imaging gain exceeds its upper limit, flash imaging is performed.

However, in flash imaging, only objects that are located at the same distance from the flash device are properly exposed. Therefore, in the technique discussed in Japanese Patent Application Laid-Open No. 2005-204120, when objects that differ in object distances exist in a imaging plane at the time of flash imaging, the object at the longer distance becomes dark due to lack of light if an amount of flash is controlled so that the object at the shorter distance is properly exposed.

If the color temperature difference between background light and flash light is large, white balance control is performed with emphasis on the object at the shorter distance so that the object at the longer distance not only becomes dark but also becomes unnatural in color reproduction. Therefore, it is difficult to obtain a good image of each of the objects that differ in object distance.

In the technique discussed in Japanese Patent Application laid-Open No. 2005-181355, the shutter speed at the time of flash imaging is set lower when the depth of the object is determined to be large than when the depth of the object is determined to be small from the focus detection result of the focus detection unit having the plurality of focus detection points. Thus, an amount of exposure to background light is increased so that darkness of the object at the longer distance can be alleviated.

However, generally the shutter speed at the time of flash imaging has already been set to a minimum speed at which camera shake does not affect the captured image. However, when the shutter speed is reduced camera shake can easily affect the image so that it is difficult to obtain a good image without image blur.

SUMMARY OF THE INVENTION

According to an aspect of the present invention, An imaging apparatus capable of performing imaging using an illumination device includes a light metering unit configured to acquire object luminance information, an acquisition unit configured to acquire information relating to object distances in a plurality of areas, and a flash control unit configured to flash the illumination device during imaging if a luminance value based on the object luminance information acquired by the light meting unit is less than a threshold value, wherein the flash control unit changes the threshold value according to a difference between an object distance in a reference area and the object distances in the plurality of areas based on the information acquired by the acquisition unit.

According to another aspect of the present invention, A method for controlling an imaging apparatus capable of performing imaging using an illumination device includes acquiring object luminance information, acquiring information relating to object distances in a plurality of areas, and flashing the illumination device during imaging if a luminance value based on the acquired object luminance information is less than a threshold value, changing the threshold value according to a difference between an object distance in a reference area and the object distances in the plurality of areas based on the acquired information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 (6A and 6B) is a flowchart illustrating an operation sequence of a camera according to an exemplary embodiment of the present invention.

DESCRIPTION OF THE EMBODIMENTS

Various exemplary embodiments, features, and aspects of the invention will be described in detail below with reference to the drawings.

Figure 1:
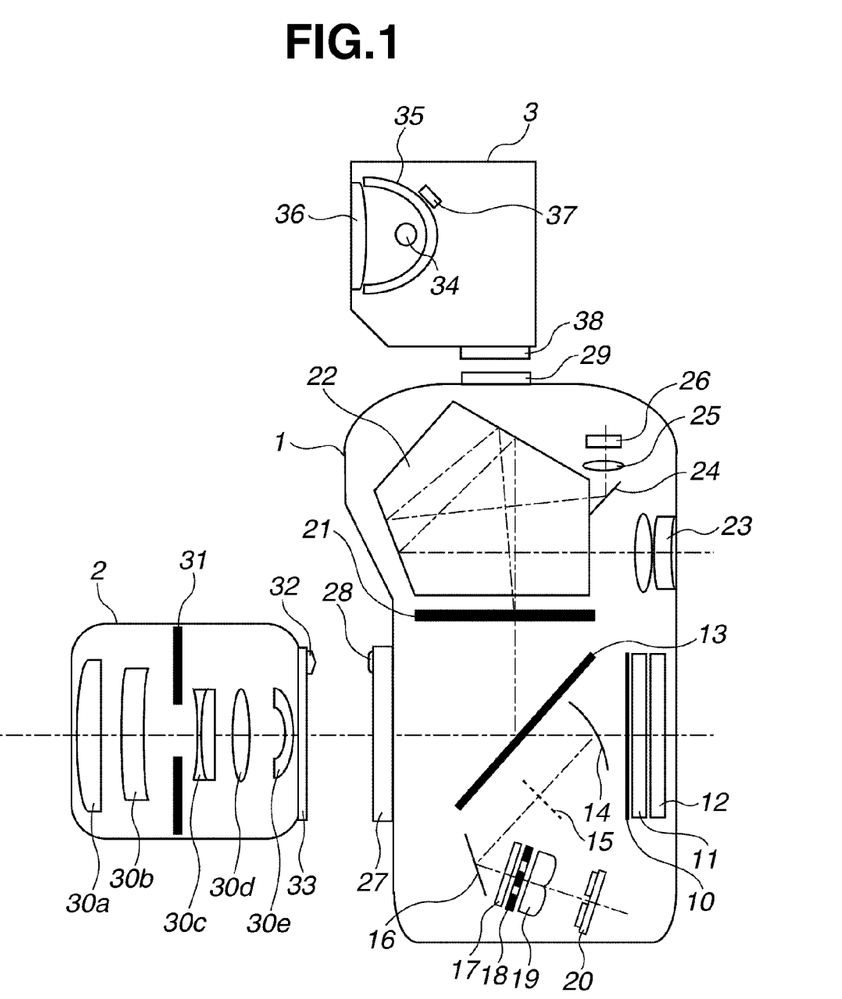
FIG. 1 is a cross-sectional view of a camera, an interchangeable lens, and a flash device according to an exemplary embodiment of the present invention.

FIG. 1 is a cross-sectional view of a camera serving as an imaging apparatus according to an exemplary embodiment of the present invention, an interchangeable lens 2, and a flash device 3 serving as an illumination device. Although a configuration of a single-lens reflex camera of an interchangeable-lens type is illustrated in FIG. 1, a lens-integrated camera may be used. While the flash device 3 serving as the illumination device is also described as an external flash unit that is detachably attached to a camera body, a flash unit contained in the camera body (a built-in flash unit) may be used.

In FIG. 1, the camera body 1 includes a mechanical shutter 10, a low-pass filter 11, and an image sensor 12 composed of an area storage type photoelectric conversion element such as a complementary metal oxide semiconductor (CMOS) sensor and a charge coupled device (CCD) sensor, for example. The image sensor 12 includes a pixel unit for performing photoelectric conversion of light incident thereon according to its light quantity and storing charges in a capacitance portion, and a reading unit for outputting the stored charges in a predetermined order. The reading unit also includes an amplification unit in which a variable gain is applied to the stored charges during reading, and a reading gain corresponding to an imaging sensitivity, described below, is settable therein.

The camera body 1 includes a semi-transparent main mirror 13 and a first reflection mirror 14. Both the semi-transparent main mirror 13 and the first reflection mirror 14 flip up, out of the optical path to the image sensor 12, when imaging is performed. The camera body 1 includes an image forming surface 15 conjugate to an image sensor surface obtained by the first reflection mirror 14, a second reflection mirror 16, an infrared cut-off filter 17, a diaphragm 18 having two openings, a secondary photographic lens 19, and a focus detection sensor 20.

Figure 2:
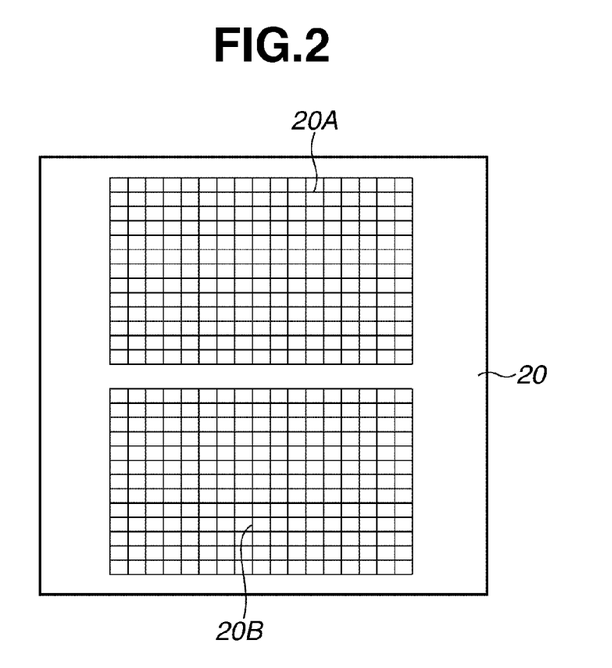
FIG. 2 illustrates an example configuration of a focus detection sensor according to an exemplary embodiment of the present invention.

The focus detection sensor 20 includes an area storage type photoelectric conversion element such as a CMOS sensor and a CCD sensor, for example. A large number of separated light receiving sensor units constitute a pair of areas 20A and 20B corresponding to the two openings of the diaphragm 18, as illustrated in FIG. 2. A configuration from the first reflection mirror 14 to the focus detection sensor 20 enables focus detection by using a phase difference detection system at any position in an imaging plane.

The camera body 1 further includes a focus plate 21 having diffusivity, a pentagonal prism 22, an eyepiece lens 23, a third reflection mirror 24, a condenser lens 25, and a light metering sensor 26 for measuring an object luminance.

Figure 3:
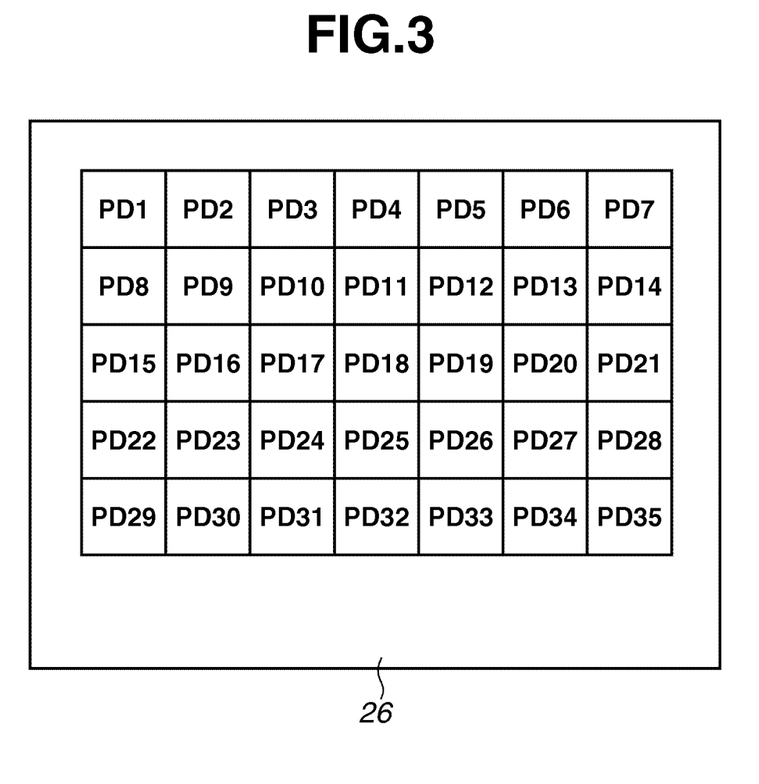
FIG. 3 illustrates an example configuration of a light metering sensor according to an exemplary embodiment of the present invention.

The light metering sensor 26 includes a photoelectric conversion element such as a silicon photodiode, and is divided into a plurality of light receiving sensor units in a lattice shape, as illustrated in FIG. 3. In the present embodiment, the imaging plane is divided into 35 (7 rows by 5 columns) light receiving units (light metering areas) PD1 to PD35. Some light beams reflected by the main mirror 13 and diffused by the focus plate 21, which fall outside of the optical axis, are incident on the light metering sensor 26.

Figure 4:
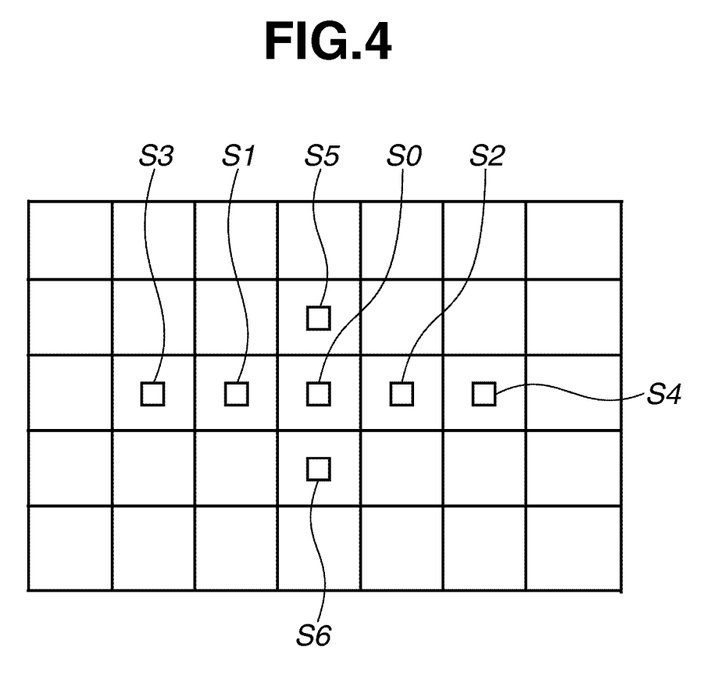
FIG. 4 illustrates a correspondence positional relationship between a focus detection area and a light metering area in an imaging plane.

FIG. 4 illustrates a correspondence positional relationship between a plurality of focus detection areas in the imaging plane where the focus detection sensor 20 can detect a focus state and the 35 light metering areas in the light metering sensor 26. In the present exemplary embodiment, the imaging plane includes seven focus detection areas S0 to S6. In the focus detection area S0, focus detection is performed at a position corresponding to the light metering area PD18 in the light metering sensor 26.

In the other focus detection areas, focus detection is performed at positions respectively corresponding to the different light metering areas, as illustrated in FIG. 4. The respective numbers of focus detection areas and light metering areas are not limited to the numbers in this embodiment. For example, the respective numbers of focus detection areas and light metering areas may be the same.

The camera body 1 further includes a mount unit 27 for mounting an photographic lens, a contact unit 28 for performing information communication with the photographic lens, and a connection unit 29 capable of mounting the flash device 3. The interchangeable lens 2 includes optical lens 30a to 30e constituting the photographic lens, a diaphragm 31, a contact unit 32 for performing information communication with the camera body 1, and a mount unit 33 for mounting the interchangeable lens 2 on the camera.

The flash device 3 includes a xenon lamp (flash unit) 34, a reflector 35, a condensing Fresnel lens 36, a monitor sensor 37 for monitoring the amount of emission of the flash unit 34, and a mounting unit 38 for mounting the flash device 3 on the camera body 1.

Figure 5:
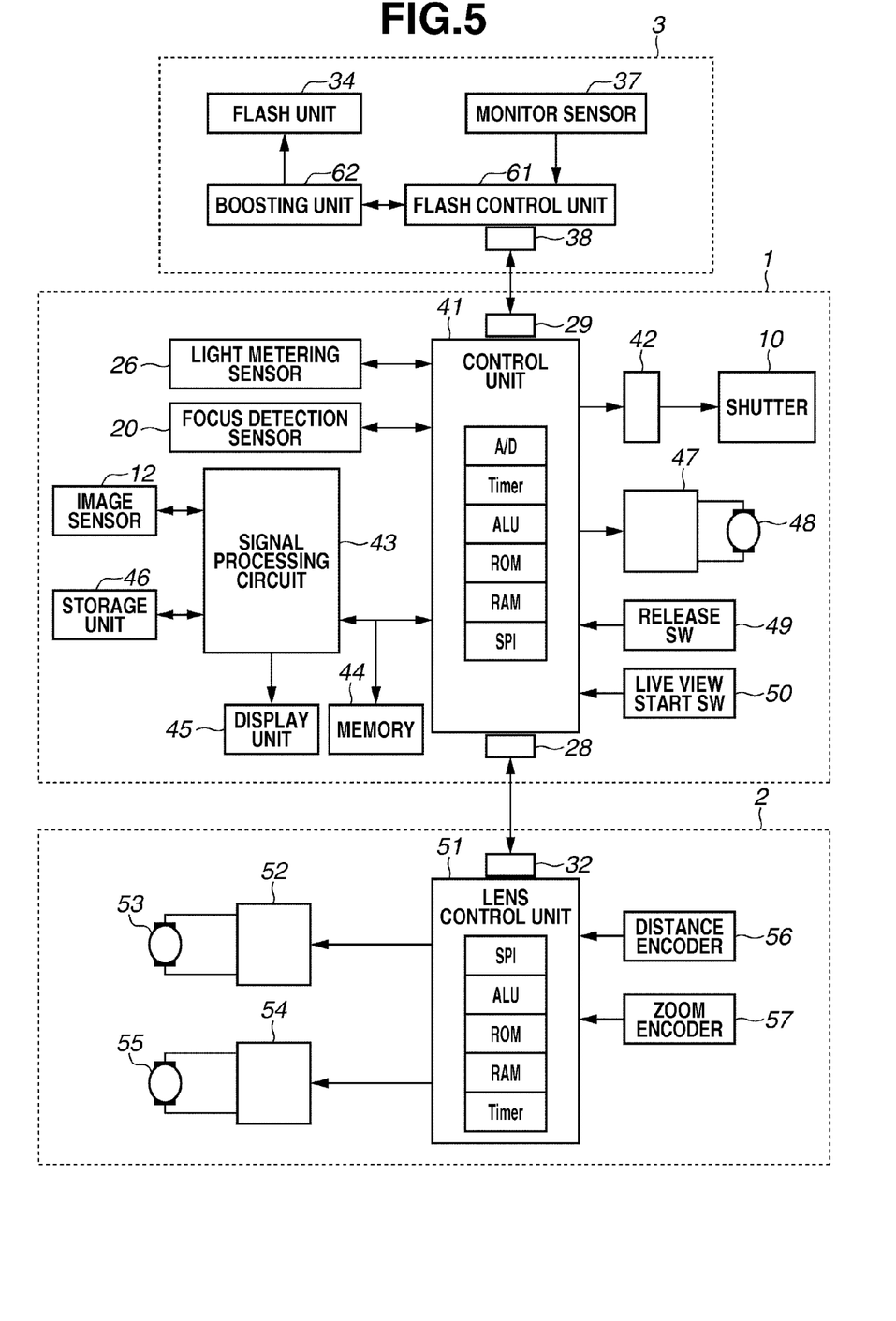
FIG. 5 is a block diagram illustrating an example configuration of electric circuits in a camera, an interchangeable lens, and a flash device according to an exemplary embodiment of the present invention.

FIG. 5 is a block diagram illustrating an example configuration of the electric circuits in the camera body 1, the interchangeable lens 2, and the flash device 3. In the camera body 1, a control unit 41 includes a one-chip microcomputer that incorporates an arithmetic and logical unit (ALU), a read-only memory (ROM), a random access memory (RAM), an analog-to-digital (A/D) converter, a timer, and a serial communication port (SPI), for example, to perform the whole control of a camera mechanism or the like.

A specific control flow of the control unit 41 will be described below. The focus detection sensor 20 and the light metering sensor 26 are the same as those illustrated in FIG. 1. Output signals of the focus detection sensor 20 and the light metering sensor 26 are respectively input to the A/D converter input terminals of the control unit 41.

A shutter driving unit 42 is connected to an output terminal of the control unit 41, to drive the mechanical shutter 10 illustrated in FIG. 1. A signal processing circuit 43 controls the image sensor 12 according to instructions from the control unit 41, to set a read gain of the image sensor 12 while subjecting an imaging signal output by the image sensor 12 to A/D conversion to perform signal processing, to obtain image data. The signal processing circuit 43 also performs the function of extracting features such as eyes and mouth of a person from the image data to detect a face area of the person.

Furthermore, image processing such as compression required in recording the obtained image data can also be performed, and display image data can also be generated. A memory 44 such as a dynamic random access memory (DRAM) is used as a working memory when the signal processing circuit 43 performs various types of signal processing, and is used as a video random access memory (VRAM) when an image is displayed on a display unit 45, described below.

The display unit 45 includes a thin-film transistor (TFT) liquid crystal panel or an organic electroluminescence (EL) panel, and displays various types of imaging information and a captured image. The display unit 45 is controlled to perform display based on the display image data output from the signal processing circuit 43 by an instruction from the control unit 41.

A storage unit 46 including a flash memory or an optical disk stores image data obtained by imaging. A first motor driver 47 is connected to an output terminal of the control unit 41 and controlled by the control unit 41, to drive a first motor 48 for moving the main mirror 13 and the first reflection mirror 14 up and down and charging the mechanical shutter 10.

The camera body 1 includes as an operation unit a release switch 49, a live view start switch 50 for starting a live view function for sequentially displaying through images sequentially captured by the image sensor 12 on the display unit 45. An input/output signal to/from a serial communication port of the control unit 41 is transmitted via the contact unit 28. The input/output signal to/from the serial communication port of the control unit 41 is transmitted via the connection unit 29 so that the camera body 1 can communicate with the flash device 3.

In the interchangeable lens 2, a lens control unit 51 includes a one-chip microcomputer that incorporates an ALU, a ROM, a RAM, a timer, and an SPI, for example.

A second motor driver 52 is connected to an output terminal of the lens control unit 51 and controlled by the lens control unit 51, to drive a second motor 53 for performing focus adjustment. A third motor driver 54 is connected to an output terminal of the lens control unit 51 and controlled by the lens control unit 51, to drive a third motor 55 for controlling the diaphragm 31.

A distance encoder 56 is used to obtain an amount of extension of the focus adjustment lens, i.e., information relating to an object distance, and is connected to an input terminal of the lens control unit 51. A zoom encoder 57 is used to obtain focal length information during imaging if the interchangeable lens 2 is a zoom lens, and is connected to an input terminal of the lens control unit 51. The input/output signal to/from the serial communication port of the lens control unit 51 is transmitted to the contact unit 32.

When the interchangeable lens 2 is mounted on the camera body 1, the respective contact units 28 and 32 are connected to each other so that the lens control unit 51 can perform data communication with the control unit 41 in the camera body 1. Optical information specific to the lens required for the control unit 41 in the camera body 1 to perform focus detection and exposure calculation, information relating to an object distance, and focal length information are output through data communication from the lens control unit 51 to the control unit 41 in the camera body 1.

Focus adjustment information and diaphragm information obtained as a result of the control unit 41 in the camera body 1 performing focus detection and exposure calculation are output by using data communication from the control unit 41 in the camera body 1 to the lens control unit 51. The lens control unit 51 controls the second motor driver 52 according to the focus adjustment information, and controls the third motor driver 54 according to the diaphragm information.

In the flash device 3, a flash control unit 61 includes a one-chip microcomputer that incorporates an ALU, a ROM, a RAM, an A/D converter, a timer, and an SPI, for example.

A boosting unit 62 functions to generate a high voltage, of approximately 300 V, which is required to actuate the flash unit 34. The flash unit 34 and the monitor sensor 37 are the same as those illustrated in FIG. 1.

When the flash device 3 is mounted on the camera body 1, their respective connection units 38 and 29 are connected to each other so that the flash control unit 61 can perform data communication with the control unit 41 in the camera body 1. The flash control unit 61 controls the boosting unit 62 according to an instruction, from the control unit 41 in the camera body 1, to start and stop operation of the flash unit 34.

An amount of flash is indicated by an instruction from the control unit 41 in the camera body 1, and the monitor sensor 37 monitors the amount of flash produced and the flash is controlled to stop the flash unit 34 when the required amount of flash has been produced.

An operation sequence of the control unit 41 in the camera body 1 will be described with reference to the flowchart of FIG. 6 (6A and 6B). When a power switch (not illustrated) is turned on so that the control unit 41 becomes operable, the processing proceeds to step S101. In step S101, the control unit 41 communicates with the flash control unit 61, to instruct the boosting unit 62 to operate to charge the flash unit 34 with a high voltage sufficient to actuate the flash unit 34 to flash. In step S102, the control unit 41 then communicates with the lens control unit 51, to obtain various kinds of information relating to the lens required for focus detection and light metering.

In step S103, the control unit 41 determines whether the live view start switch 50 is turned on. If the live view start switch 50 is not turned on (NO in step S103), the processing proceeds to step S104. If the live view start switch 50 is turned on (YES in step S103), the processing proceeds to step S109.

In step S104, the control unit 41 outputs a control signal to the focus detection sensor 20, to store signals therein. When the signals have been stored in the focus detection sensor 20, the control unit 41 reads out the stored signals, and subjects the read signals to A/D conversion. Further, each of read digital data is subjected to various types of required data correction such as shading.

In step S105, the control unit 41 calculates a defocus amount in each of the focus detection areas in the imaging plane and its reliability based on the lens information required for focus detection, which has been acquired in step S102, and the digital data obtained from the focus detection sensor 20.

The defocus amount is an amount of shift in focus, which is found from an amount of shift between two images. The reliability represents the degree to which the defocus amount is accurate, which is found from the luminance of each of the two images, the contrast therebetween, and the degree of correlated matching therebetween and so on.

The higher the contrast between the images formed on the focus detection sensor 20, the smaller the effect of noise on an output of the focus detection sensor 20 becomes, and the higher the reliability becomes.

In step S105, the control unit 41 further determines, out of the focus detection areas S0 to S6, the area where an object is to be brought into focus in the imaging plane. The area may be determined to be an area selected by operating an operation member (not illustrated) by a user or an area where a main object is considered to exist based on a calculated focusing state.

The control unit 41 calculates an amount of lens movement for bringing the object into an in-focus state according to the focusing state in the determined area, and outputs the calculated amount of lens movement to the lens control unit 51. The lens control unit 51 outputs a signal to the second motor driver 52 to drive the second motor 53 to move the focus adjustment lens according to the amount of lens movement. Thus, the photographic lens is located in an in-focus position for the object existing in the determined area. At this time, information relating to the distance encoder 56 changes by moving the focus adjustment lens, to update the various types of information of the lens.

After the photographic lens is moved to the in-focus position for the object, the control unit 41 stores signals in the focus detection sensor 20 again, to calculate a focusing state in each of the focus detection areas in the imaging plane, and stores the focusing state to be usable later as information relating to the depth of the object.

Defocus amounts DF (n) corresponding to the focus detection areas S0 to S6 are stored, where n is 0 to 6 corresponding to the focus detection areas S0 to S6. The defocus amounts to be calculated are one type of information relating to object distances in a plurality of areas. The control unit 41 acquires the information relating to the plurality of object distances by performing the processing in step S105.

In step S106, the control unit 41 reads a signal in each of the 35 light metering areas PD1 to PD35 from the light metering sensor 26, and subjects the signal to A/D conversion, to acquire luminance information in each light metering area. Further, the control unit 41 corrects the luminance information in each of the light metering areas using the lens information required for light metering, which has been acquired in step S102, to obtain object luminance information in the light metering area.

In step S107, the control unit 41 performs exposure calculation based on the object luminance information in each of the light metering areas, which has been obtained in step S106, and determines whether the flash unit 34 is flashed.

The exposure calculation and the determination of the flash of the flash unit 34 in step S107 will be described with reference to a flowchart illustrated in FIG. 7.

In step S201, the control unit 41 first subjects the object luminance information in each of the light metering areas, which has been obtained in step S106, to a predetermined weighted calculation with emphasis on the light metering area corresponding to the focus detection area (in-focus area) where the object is brought into in-focus state, which has been determined in step S105, to calculate a luminance value in the whole imaging plane as an object luminance Bv(A).

In step S202, the control unit 41 then acquires information relating to the defocus amounts in the seven focus detection areas and their reliabilities, which have been obtained in step S105. In step S203, the control unit 41 changes, if the defocus amounts DF (n) in the focus detection areas include the defocus amount in the focus detection area, which falls outside a depth of focus determined based on a full aperture value of the interchangeable lens 2, the reliability of the focus detection area into a low value. Alternatively, the control unit 41 excludes the focus detection area from a determination object in determination processing performed in step S204.

In step S204, the control unit 41 determines whether the number of focus detection areas, the reliabilities of which are a predetermined value or more, is a predetermined number (more than one) or more. If the number of focus detection areas, the reliabilities of which are a predetermined value or more, is the predetermined number or more (YES in step S204), the processing proceeds to step S205. If the number of focus detection areas, the reliabilities of which are a predetermined value or more, is less than the predetermined number (NO in step S204), the processing proceeds to step S210.

In step S205, the control unit 41 determines whether the mounted interchangeable lens 2 includes the distance encoder 56. If the interchangeable lens 2 includes the distance encoder 56 to obtain the information relating to the object distance (YES in step S205), the processing proceeds to step S206. If the interchangeable lens 2 does not include the distance encoder 56 (NO in step S205), the processing proceeds to step S209.

In step S206, the control unit 41 communicates with the interchangeable lens 2 to obtain information relating to the object distance from the distance encoder 56, to acquire distance information Dobj representing an absolute distance to an object at an in-focus position.

In step S207, the control unit 41 acquires information ΔDv relating to the depth of an object from a difference between a maximum value and a minimum value of the defocus amount in each of the focus detection areas, the reliabilities of which are the predetermined value or more.

The defocus amount obtained by the focus detection using the phase difference detection system in the present exemplary embodiment represents a relative amount of out-of-focus and does not represent an absolute distance. Generally, the difference in the defocus amount changes in proportion to the square of a focal length of the photographic lens and changes in inverse proportion to the absolute distance even if differences among the object distances have the same absolute amount.

Therefore, the information ΔDv relating to the depth of the object is not differences in actual distance among the object distances if it is merely the difference in the defocus amount. Therefore, correction calculation is performed so that the information ΔDv can be summarily converted into the differences in actual distance among the object distances. In step S208, the control unit 41 performs calculation using the following equation, where ΔDvc is information relating to the corrected depth of the object.

$$\Delta Dvc = \Delta Dv \times f1(Dobj) \times f2(f)$$

In this equation, the function f1 is used to divide the distance information Dobj representing the absolute distance to the object, which has been acquired in step S206, by a reference distance D0 to normalize the distance information Dobj, and multiply the normalized distance information Dobj by a predetermined proportionality coefficient. The function f2 is used to divide focal length information f of the interchangeable lens 2 by a reference focal length f0 to normalize the focal length information f, and multiply the square of the inverse of the normalized focal length information f by a predetermined proportionality coefficient.

The information ΔDvc relating to the depth of the object represents differences among the object distances of the plurality of objects existing in the imaging plane, and takes a small value if the plurality of objects has similar object distances and takes a large value if the plurality of objects has greatly different object distances.

If the mounted interchangeable lens 2 does not have the distance encoder 56 (NO in step S205), the processing proceeds to step S209. In step S209, a predetermined value is set as the distance information Dobj representing the absolute distance to the object. The predetermined value may be a fixed value. Alternatively, the predetermined value may be changed to a value that is assumed to be relatively high in imaging frequency for each focal length of the interchangeable lens 2. Then, the processing proceeds to step S207.

If the number of focus detection areas, the reliabilities of which are the predetermined value or more, is less than the predetermined number (NO in step S204), the processing proceeds to step S210. In step S210, the control unit 41 sets a predetermined value as the information ΔDvc relating to the corrected depth of the object.

Even if the information ΔDvc relating to the corrected depth of the object is obtained based on the defocus amount in a state where the number of focus detection areas the reliabilities of which are high is small, it may not be accurate information. The predetermined value may also be a fixed value. Alternatively, the predetermined value may be changed to a value that is assumed to be relatively high in imaging frequency for each focal length of the interchangeable lens 2.

In step S211, the control unit 41 then calculates an upper limit ISO_ST of an International Organization for Standardization (ISO) sensitivity at the time of imaging from the information ΔDvc relating to the corrected depth of the object using the following equation.

$$ISO\_ST = ISO\_B + g(\Delta Dvc)$$

In the equation, ISO_B is a minimum value set as the upper limit of the ISO sensitivity, and is a fixed value, e.g., an ISO sensitivity of 200. A function g is used to find a value that is proportional to the logarithm of √2 of a value of the information ΔDvc relating to the corrected depth of the object. In flash imaging, an object at a distance √2 times away from an object existing at an imaging distance is underexposed by one step for an amount of flash in which the object is exposed properly.

The upper limit ISO_ST of the ISO sensitivity obtained by the calculation becomes larger by one step than the minimum value ISO_B every time the value of the information ΔDvc relating to the corrected depth of the object increases by √2 times. An imaging ISO sensitivity that can be set by the camera has its upper limit. Therefore, the upper limit ISO_ST itself does not exceed an upper limit of the imaging ISO sensitivity that can be set by the camera. A value lower than the upper limit of the imaging ISO sensitivity that can be set by the camera may be the upper limit ISO_ST itself.

In step S212, the control unit 41 sets a program diagram based on the upper limit ISO_ST of the ISO sensitivity, which has been obtained in step S211, and the object luminance Bv(A), which has been obtained in step S201, and determines the imaging exposure value and the need of flash of the flash unit 34 according to the program diagram.

A specific example of the program diagram and a change in the upper limit ISO_ST of the ISO sensitivity by the information ΔDvc relating to the corrected depth of the object will be described with reference to FIG. 9.

Figure 9:
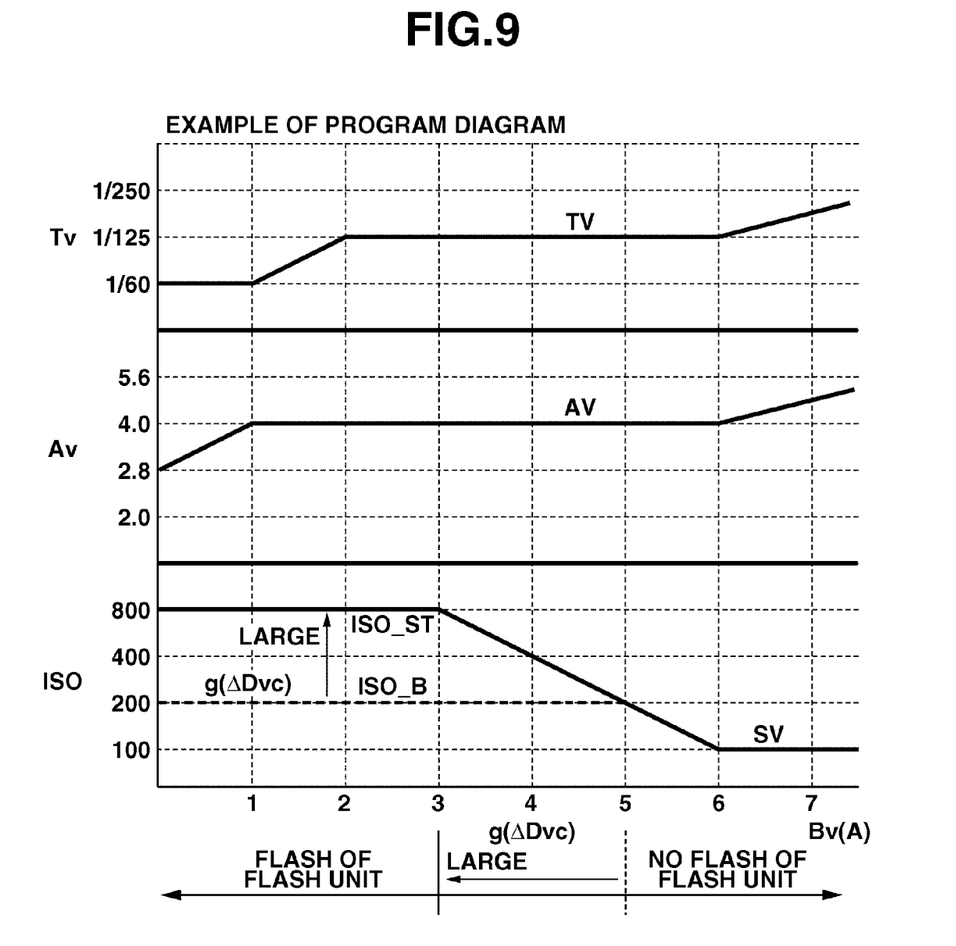
FIG. 9 is a program diagram

FIG. 9 plots the object luminance Bv(A), which has been obtained in step S201, as the abscissa, to illustrate to what values a shutter speed Tv, a diaphragm value Av, and a imaging ISO sensitivity used for imaging are set.

More specifically, if the object luminance Bv(A) is 6 or more, the imaging ISO sensitivity is set to 100, to continuously change the shutter speed Tv and the diaphragm value Av to obtain proper exposure. If the object luminance Bv(A) is 5 or more and less than 6, the shutter speed Tv is fixed at 1/125 and the diaphragm value Av is fixed at 4.0, to change the imaging ISO sensitivity between 100 and 200 to obtain proper exposure.

In the program diagram illustrated in FIG. 9, if the object luminance Bv(A) is 5 or more, automatic flash imaging is not performed.

Figure 7:
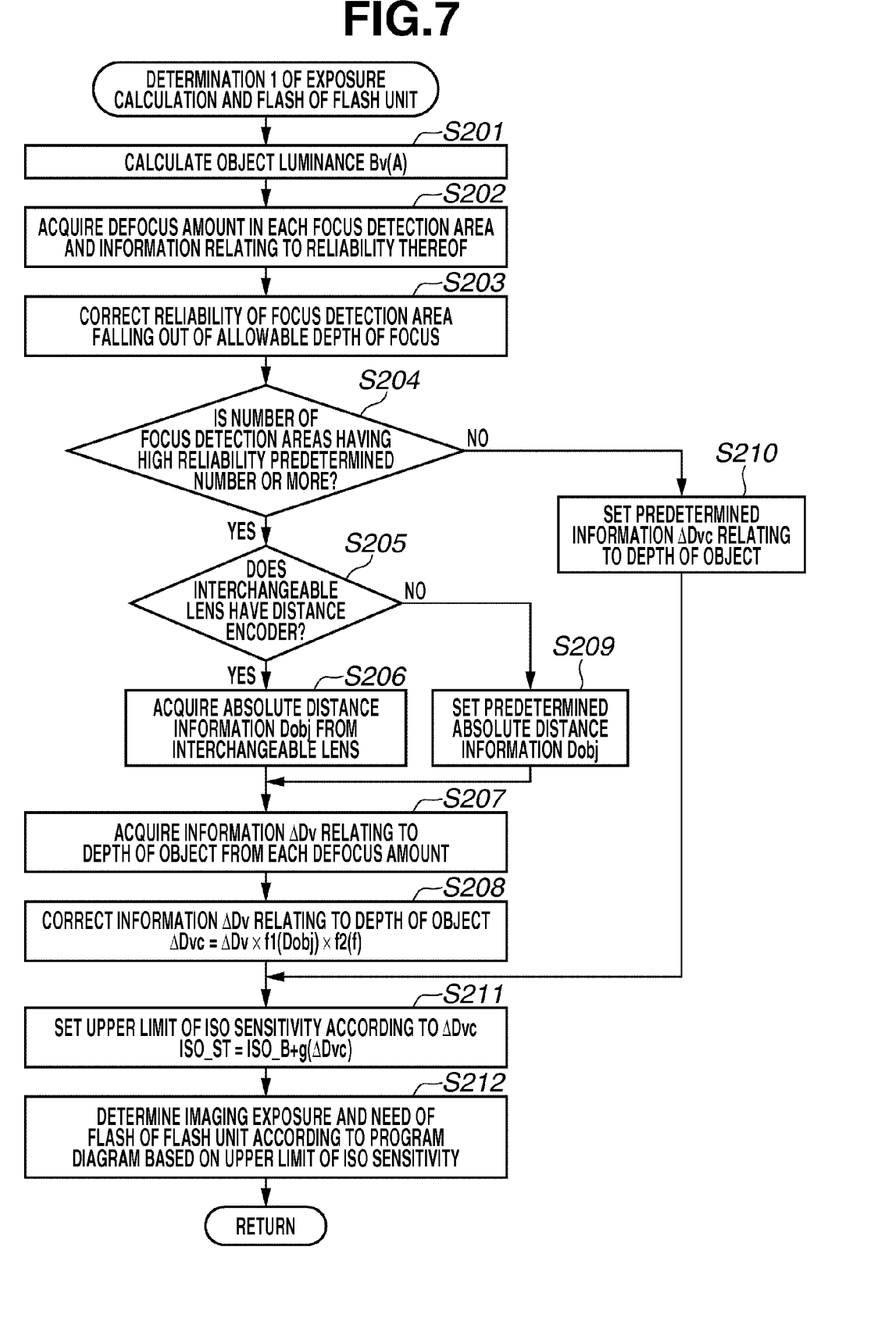
FIG. 7 is a flowchart illustrating exposure calculation and flash unit flash determination processing.

If the value of the information ΔDvc relating to the corrected depth of the object, which has been determined by the processing illustrated in FIG. 7, is less than a first threshold value, the upper limit ISO_ST of the ISO sensitivity becomes equal to the minimum value ISO_B, so that control as indicated by a broken line is performed.

Under this condition, if the object luminance Bv(A) is less than 5, automatic flash imaging is performed, and the imaging ISO sensitivity is fixed at 200. If the value of the information ΔDvc relating to the corrected depth of the object is less than the first threshold value, the differences among the object distances of the plurality of objects in the imaging plane are sufficiently small. Therefore, the whole object in the imaging plane can be properly exposed by irradiating the object with flashlight.

On the other hand, if the value of the information ΔDvc relating to the corrected depth of the object is a second threshold value or more, which is larger than the first threshold value, the upper limit ISO_ST of the ISO sensitivity becomes the upper limit of the imaging ISO sensitivity that can be set by the camera. If the upper limit of the imaging ISO sensitivity that can be set by the camera is set to 800, control as indicated by a solid line is performed.

Under this condition, if the object luminance Bv(A) is less than 3, automatic flash imaging is performed, and the imaging ISO sensitivity is fixed at 800.

If the object luminance Bv(A) is 3 or more and less than 5, the shutter speed Tv is fixed at 1/125 and the diaphragm value Av is fixed at 4.0, to charge the imaging ISO sensitivity between 200 and 800 to obtain proper exposure.

If the value of the information ΔDvc relating to the corrected depth of the object is the second threshold value or more, the differences among the object distances of the plurality of objects in the imaging plane are sufficiently large. Therefore, the whole object in the imaging plane is difficult to properly expose even if it is irradiated with flashlight. Thus, such control is performed to increase the possibility of properly exposing the object with external light by making the imaging ISO sensitivity as high as possible.

If the value of the information ΔDvc relating to the corrected depth of the object is the first threshold value or more and less than the second threshold value, the upper limit ISO_ST of the ISO sensitivity changes between 200 and 800 according to the value. A luminance threshold value as to whether automatic flash imaging is performed is determined according to the value.

Figures 6, 6A:
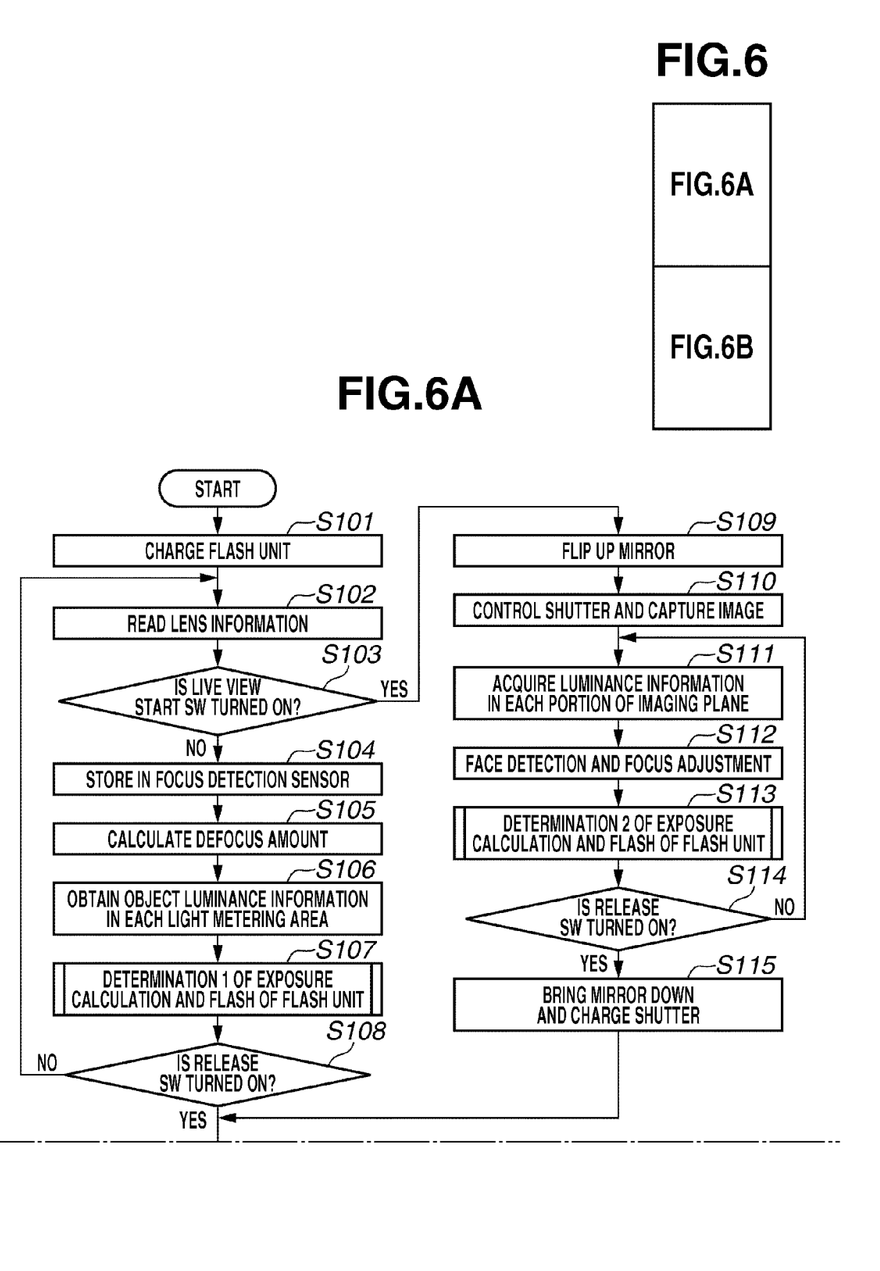
Figure 6B:
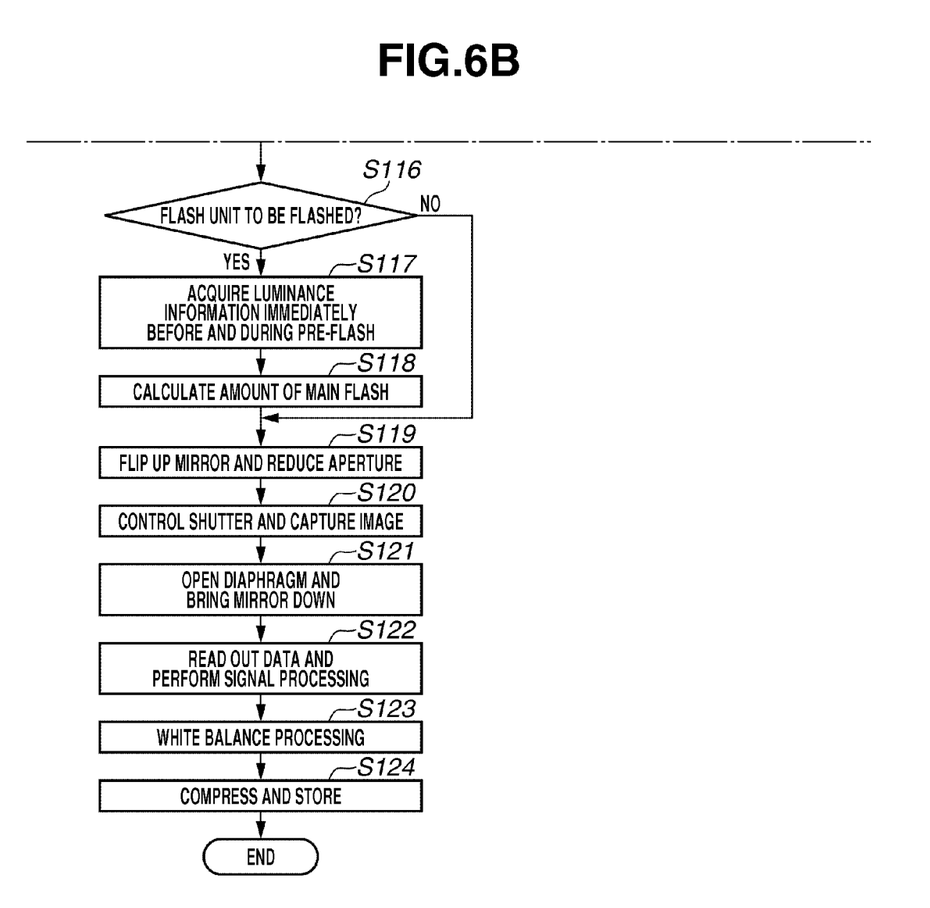

If the shutter speed Tv, the diaphragm value Av, and the imaging ISO sensitivity used for imaging are determined in the above-mentioned manner, the processing proceeds to step S108 in the flowchart illustrated in FIG. 6.

When the control unit 41 determines the exposure calculation and the need of the flash of the flash unit 34, the processing proceeds to step S108. In step S108, the control unit 41 waits until the release switch 49 is turned on. If the release switch 49 is not turned on even if a predetermined period of time has elapsed (NO in step S108), the processing returns to step S102. The above-mentioned steps are repeated. If the release switch 49 is turned on (YES in step S108), the processing proceeds to step S116.

If it is determined that the live view start switch 50 is turned on (YES in step S103), the processing proceeds to step S109.

In step S109, the control unit 41 outputs a control signal to the first motor driver 47, to drive the first motor 48 to flip up the main mirror 13 and the first reflection mirror 14.

In step S110, the control unit 41 then outputs a signal to the shutter driving unit 42, to bring the mechanical shutter 10 into an open state. Thus, a light beam from the photographic lens is incident on the image sensor 12 so that imaging can be performed.

The control unit 41 then instructs the signal processing circuit 43 to perform imaging by the image sensor 12. When an imaging operation is started, images periodically obtained are sequentially displayed on the display unit 45. Thus, a live view operation is started.

In step S111, the control unit 41 acquires luminance information and color information in each portion of the imaging plane from image data representing the captured image, to correct a charge accumulation time and color processing so that brightness and color tone of the live view image displayed on the display unit 45 become appropriate.

In step S112, the control unit 41 performs face detection processing for an object from the image data. In this processing, the control unit 41 extracts feature edges of the eyes and the mouth from the image data to detect a face position of a person, further detects a contour including the eyes and the mouth, and finds its barycentric position (weighted center position) while calculating a luminance in an area in the contour. Face position information and face size information in the imaging plane are respectively found based on the calculated barycentric position and information relating to the contour.

If a plurality of faces exists in the imaging plane, position information FP(m) and size information FS(m) in each of a plurality of detected face areas are found as face detection information of each of the faces, where m is a natural number representing the number of detected faces.

The size information FS(m) in the plurality of face areas thus obtained are one type of information relating to object distances in the plurality of areas. By performing the processing in step S112, the control unit 41 acquires information relating to the plurality of object distances.

In step S112, the control unit 41 further determines a main object from the position information and the size information in the obtained face area, to issue a lens driving instruction to the lens control unit 51 to perform focus adjustment so that the photographic lens enters an in-focus state for the main object. Thus, the control unit 41 functions as a determination unit for determining the main object from the plurality of objects.

The lens control unit 51 outputs a signal to the second motor driver 52 to drive the second motor 53 to move the focus adjustment lens. The control unit 41 issues a lens driving instruction to the lens control unit 51 to stop the lens at a position where a contrast value of image information reaches its maximum.

Thus, the photographic lens enters an in-focus state for the main object. Information relating to the distance encoder 56 changes according to the movement of the focus adjustment lens. Therefore, the control unit 41 updates the various kinds of information relating to the lens.

In step S113, the control unit 41 determines whether exposure calculation and automatic flash of the flash unit 34 for main imaging are to be performed. The determination of the exposure calculation and the flash of the flash unit 34 in step S113 will be described referring to a flowchart of FIG. 8.

Figure 8:
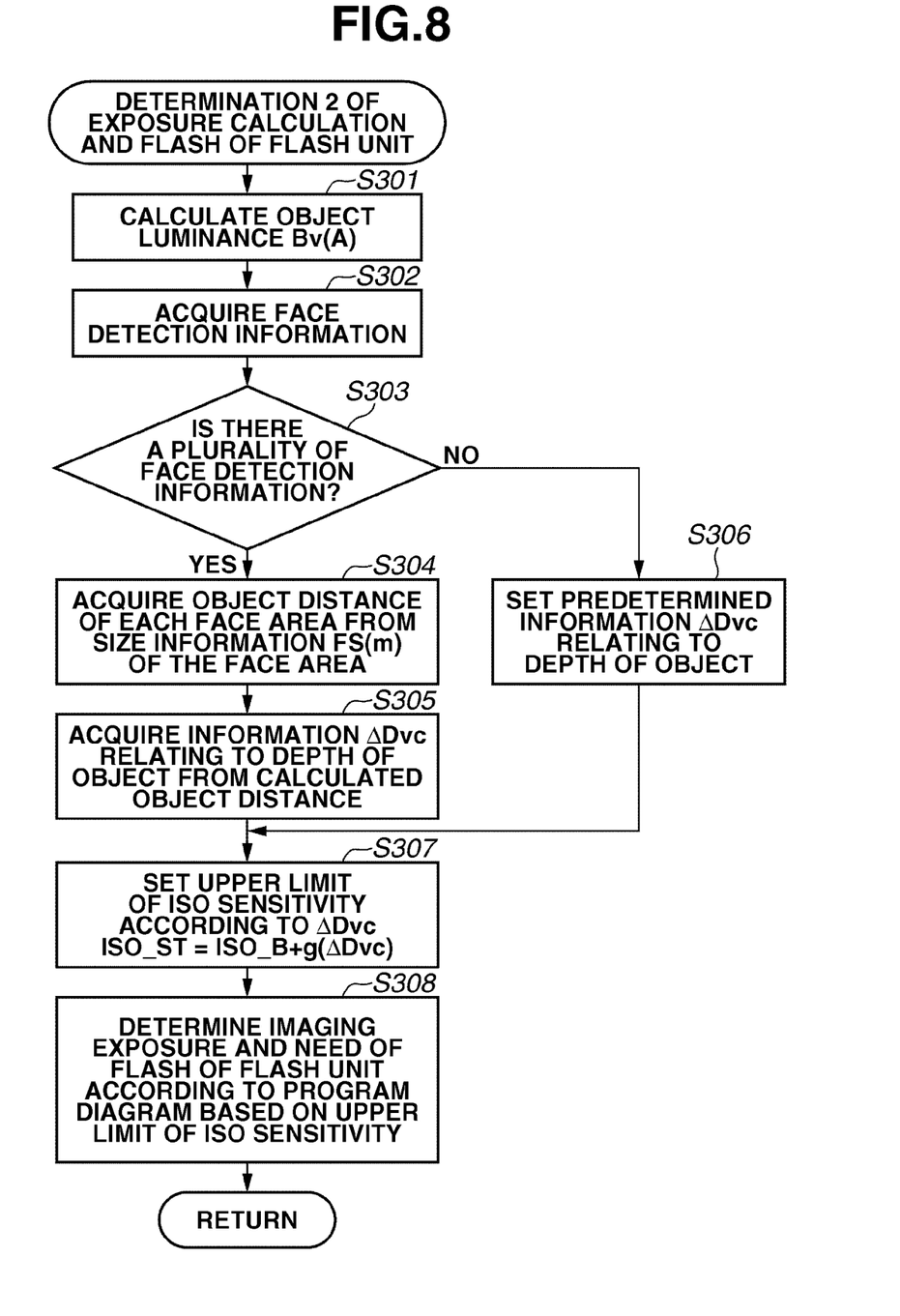
FIG. 8 is a flowchart illustrating exposure calculation and flash unit emission determination processing.

In step S301, the control unit 41 subjects the luminance information in each portion of the imaging plane, which has been obtained in step S111, to predetermined weighted calculation with emphasis on an area where an object is brought into in-focus state at the time of focus adjustment, to calculate an object luminance Bv(A) in the whole imaging plane.

In step S302, the control unit 41 acquires the size information FS(m) in the face areas serving as the face detection information, which has been obtained in step S112. The control unit 41 excludes an object having position information FP(m) in a face area, which is closer to an end of the imaging plane than a predetermined area, and size information FS(m) in the face area, which is larger or smaller than a predetermined range, as low in importance degree.

In step S303, the control unit 41 determines whether the size information FS(m) of the face area, which has been acquired in step S302, includes a plurality of size information FS(m). If the plurality of size information FS(m) exist (YES in step S303), the processing proceeds to step S304. If the plurality of size information FS(m) does not exist (NO in step S303), the processing proceeds to step S306. While the control unit determines whether the acquired size information FS(m) in the face area includes a plurality of size information FS(m) in step S303, the control unit 41 may determine whether the acquired size information FS(m) of the face area includes a plurality of objects high in importance degree in step 303 without excluding the face detection information of the object low in importance degree in step S302.

In step S304, the control unit 41 calculates the object distance to each of the face areas from the size information FS(m) of the face area, which has been obtained in step S302.

While the size of the face of a person naturally varies depending on ages and individuals, the average head width of Japanese is estimated to be 162 mm according to a data collection of body dimensions for a design by National Institute of Bioscience and Human-Technology. On the other hand, the average head width of Americans (men) is estimated to be 155 mm according to Humanscale Published by The MIT Press.

From such statistical data, the size of the face of an actual person is set to 160 mm, and a ratio of the size of the face of the person to the size information FS(m) of the face area in the imaging plane matches a ratio of the object distance to the focal length of the photographic lens so that the object distance can be calculated.

In step S305, the control unit 41 calculates the information ΔDvc relating to the corrected depth of the object from a difference between a maximum value and a minimum value of the object distance in each of the face areas, which has been obtained in step S304.

If the information relating to the object distance is acquired from the size information FS(m) of the face area, the information need not be corrected because it becomes depth information in actual distance, unlike the defocus amount obtained by the focus detection using the phase difference detection system. In the following steps, the control unit 41 directly handles a value of the information as the information ΔDvc relating to the corrected depth of the object.

On the other hand, if the size information FS(m) of the face area, which has been acquired in step S302, does not include a plurality of size information FS(m), the information ΔDvc relating to the corrected depth of the object cannot be calculated from the size information FS(m). In step S306, the control unit 41 sets a predetermined value as the information ΔDvc relating to the corrected depth of the object, like in step S210.

The predetermined value may be equal to the predetermined value to be set in step S210, or may be a fixed value. Alternatively, it may be changed to a value that is assumed to be relatively high in imaging frequency for each focal length of the interchangeable lens 2.

In step S307, the control unit 41 calculates the upper limit ISO_ST of the ISO sensitivity at the time of imaging from the information ΔDvc relating to the corrected depth of the object according to the following equation, like in step S211.

$$ISO\_ST = ISO\_B + g(\Delta Dvc)$$

In step S308, the control unit 41 sets a program diagram based on the upper limit ISO_ST of the ISO sensitivity, which has been obtained in step S307, and the object luminance Bv(A), which has been obtained in step S301, and determines the imaging exposure value and need of flash of the flash unit 34 according to the program diagram. Then, the processing proceeds to step S114 in the flowchart illustrated in FIG. 6.

If the exposure calculation and the need of the flash of the flash unit 34 is determined in step S113, the processing proceeds to step S114. In step S114, the control unit 41 waits until the release switch 49 is turned on. If the release switch 49 is not turned on even if a predetermined period of time has elapsed (NO in step S114), the processing returns to step S111, and the above-mentioned steps are repeated. If the release switch 49 is turned on (YES in step S114), the processing proceeds to step S115.

In step S115, the control unit 41 outputs a signal to the shutter driving unit 42, to close the mechanical shutter 10 to end the live view operation. The control unit 41 then outputs a control signal to the first motor driver 47, to drive the first motor 48 to bring the main mirror 13 and the first reflection mirror 14 down from the flipped-up states while charging the mechanical shutter 10.

In step S116, the control unit 41 determines whether it is determined that the flash unit 34 is to be flashed to perform imaging in step S107 or step S113. If it is determined that the flash unit 34 is to be flashed to perform imaging in step S107 or S113 (YES in step S116), the processing proceeds to step S117.

In step S117, the control unit 41 reads out a signal in each of the 35 light metering areas PD1 to PD35 in the imaging plane from the light metering sensor 26 and subjects the signal to A/D conversion, to acquire luminance information immediately before pre-flash in the light metering area. The luminance information immediately before pre-flash in each of the light metering areas is hereinafter referred to as P(i).

Then, the control unit 41 communicates with the flash control unit 61, to instruct the flash control unit 61 to pre-flash the flash unit 34. Thus, the flash control unit 61 flashes the flash unit 34 so that the flash unit 34 is flashed by a predetermined amount of pre-flash based on the output signal of the monitor sensor 37. The control unit 41 reads out a signal in each of the 35 light metering areas PD1 to PD35 in the imaging plane from the light metering sensor 26 to obtain object luminance information, and subjects the signal to A/D conversion while the flash unit 34 is pre-flashed, to acquire luminance information at the time of pre-flash in the light metering area.

The luminance information at the time of pre-flash in each of the light metering areas is hereinafter referred to as H(i). i in the luminance information P(i) and H(i) is 1 to 35 respectively corresponding to the 35 light metering areas.

In step S118, the control unit 41 performs calculation for determining an amount of main flash of the flash unit 34. The control unit 41 determines the amount of main flash of the flash unit 34 from the luminance information P(i) immediately before pre-flash in each of the light metering areas and the luminance information H(i) at the time of pre-flash in the light metering area. If it is not determined that the flash unit 34 is flashed to perform imaging (NO in step S116), the processing proceeds to step S119 without performing processing in steps S117 and S118.

In step S119, the control unit 41 outputs a control signal to the first motor driver 47, to drive the first motor 48 to flip up the main mirror 13 and the first reflection mirror 14. The control unit 41 then outputs information relating to the diaphragm value, which has been determined in step S107 or step S113, to the lens control unit 51.

The lens control unit 51 outputs a signal to the third motor driver 54 to drive the third motor 55 to drive the diaphragm 31 according to the information. Thus, the photographic lens enters an aperture reducing state.

In step S120, the control unit 41 outputs a signal to the shutter driving unit 42, to bring the mechanical shutter 10 into an open state. Thus, light that has passed through the photographic lens is incident on the image sensor 12, to enable imaging. The control unit 41 instructs the signal processing circuit 43 to perform imaging by the image sensor 12 according to the shutter speed, which has been determined in step S107 or S113.

When flash imaging is performed, the control unit 41 instructs the flash control unit 61 to emit flashlight in synchronization with the imaging timing. The flash control unit 61 flashes the flash unit 34 based on an output signal of the monitor sensor 37 so that the amount of main flash, which has been calculated in step S117, is obtained according to the flash instruction. Thus, imaging is performed while the flash unit 34 is flashed.

When the imaging ends, the control unit 41 outputs a signal to the shutter driving unit 42, to bring the mechanical shutter 10 into a light shielded state. Thus, the light that has passed through the photographic lens is shielded from the image sensor 12.

In step S121, the control unit 41 outputs diaphragm control information to the lens control unit 51 to open the diaphragm 31. The lens control unit 51 outputs a signal to the third motor driver 54 to drive the third motor 55, to drive the diaphragm 31 according to the diaphragm control information. Thus, the photographic lens enters a diaphragm open state. Further, the control unit 41 outputs a control signal to the first motor driver 47 to drive the first motor 48, to bring the main mirror 13 and the reflection mirror 14 down.

In step S122, the control unit 41 reads out image data from the image sensor 12 and subjects the image data to A/D conversion, and instructs the signal processing circuit 43 to perform required correction processing and interpolation processing.

In step S123, the control unit 41 instructs the signal processing circuit 43 to perform white balance processing for the image data. More specifically, the control unit 41 divides one plane into a plurality of areas, and extracts a white area of an object from a color difference signal in each of the areas. Further, the control unit 41 subjects a red channel and a blue channel on the whole plane to the gain correction to perform white balance adjustment based on the signal from the extracted area.

In step S124, the control unit 41 instructs the signal processing circuit 43 to convert the image data that has been subjected to the white balance adjustment into a predetermined recording file format by compression transform, and store the recording file format in the storage unit 46. A single imaging sequence thus ends.

As described above, if the object distances of the plurality of objects in the imaging plane slightly differ, switching to flash imaging is performed under conditions of a relatively low sensitivity and a relatively high object luminance when the object luminances become low. This results in suppression of an increase in noise generated by increasing the imaging sensitivity, thereby enabling, even if a plurality of objects in the imaging plane exists, each of the objects to be satisfactorily exposed.

On the other hand, if the object distances of the plurality of objects in the imaging plane greatly differ, switching to flash imaging is performed under conditions of a relatively high sensitivity and a relatively low object luminance when the object luminances become low. More specifically, the larger the depth information representing the differences among the object distances of the plurality of objects in the imaging plane is, the lower threshold values for the object luminance at which imaging is performed by flashing the flash device 3 is set, and the higher the upper limit of the imaging sensitivity set when imaging is performed without flashing the flash device 3 is set.

This results in an increased number of captured scenes where imaging is performed while the object at the shorter distance and the object at the longer distance are respectively irradiated with light (natural light) at the same color temperature, thereby enabling unnaturalness in color reproduction by white balance control due to a difference in the color temperature between the irradiated light beams to be suppressed.

Since imaging is performed while both the object at the shorter distance and the object at the longer distance are irradiated with the same natural light, the object at the shorter distance and the object at the longer distance can be captured to be similar in brightness. An increase in the imaging sensitivity at the time of flash of the flash unit 34 enables the object at the longer distance which flashlight does not reach to be captured brightly with natural light even if the object luminance is low.

The switching of the program diagram depending on the value of the information ΔDvc relating to the corrected depth of the object described in the present exemplary embodiment is just an example. A shutter speed, a diaphragm value, an imaging sensitivity, and a luminance at which switching to flash imaging is performed, which are set for the object luminance, are not limited to the values in the present exemplary embodiment.

If the absolute distance information Dobj to the object falls out of a predetermined range in step S208, correction processing may be performed so that the information ΔDvc relating to the corrected depth of the object takes a larger value than that of the information relating to the actual depth of the object.

If the absolute distance information Dobj is larger than the upper limit of the predetermined range, an object to be a reference of the absolute distance information Dobj exists at a significantly long distance. Therefore, flashlight may not reach the object even if it is emitted with its maximum.

On the other hand, if the object distance information Dobj is smaller than a lower limit of the predetermined range, an object to be the reference of the absolute distance information Dobj exists at a significantly short distance. Therefore, the object may be overexposed even if flashlight is emitted with its minimum amount of flash that the flash unit 34 can be controlled.

Under such conditions, a good image can be captured by switching to flash imaging under conditions of a sensitivity that is as high as possible and a relatively low object luminance. Further, a good image can be captured in more imaging scenes by performing correction processing so that the value of the information ΔDvc relating to the corrected depth of the object takes a larger value than that of the information relating to the actual depth of the object with increasing absolute distance information Dobj from the predetermined range.

While the area corresponding to the absolute distance information Dobj is the reference area, an area that is considered to include a main object may be the reference area based on the focusing state, which has been calculated in step S105. Alternatively, the area including the main object, which has been determined in step S112, may be the reference area. Alternatively, an area at the shortest object distance in the depth of focus determined based on the full aperture value of the interchangeable lens 2 may be the reference area based on the defocus amount, which has been obtained in step S202.

While the present invention is applied to the imaging apparatus when a still image is captured in the present exemplary embodiment, it may be applied thereto when a moving image is captured. For example, the larger the depth information relating to the object in the imaging plane is at the time of moving image capturing, the lower the threshold value for an object luminance used to determine the need of flashing an illumination device such as a video light while the higher the upper limit of the imaging sensitivity set when imaging is performed without flashing the illumination device may be set.

Instead of increasing the upper limit of the imaging sensitivity to be set when imaging is performed without flashing the flash device, the lower limit of a diaphragm value may be decreased (the maximum opening size of a diaphragm may be increased) or the minimum shutter speed may be decreased (the maximum exposure time may be lengthened).

The present invention is also implemented by executing processing for supplying software (a program) for implementing the function of the above-mentioned embodiment to a system or an apparatus via a network or various types of storage media and reading the program by a computer (or a CPU or a MPU) in the system or the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-209320 filed Sep. 17, 2010, which is hereby incorporated by reference herein in its entirety.

What is claimed is:

1. An imaging apparatus capable of performing imaging using an illumination device, comprising:
    a light metering unit configured to acquire object luminance information;
    an acquisition unit configured to acquire information relating to object distances in a plurality of areas; and
    a flash control unit configured to actuate the illumination device during imaging if a luminance value based on the object luminance information acquired by the light metering unit is less than a threshold value,
    wherein the flash control unit changes the threshold value according to an object distance in a reference area and a difference between the object distances in the plurality of areas based on the information acquired by the acquisition unit,
    wherein the flash control unit decreases the threshold value with increasing object distance in the reference area from a predetermined range.

2. The imaging apparatus according to claim 1, wherein the flash control unit decreases the threshold value with increasing differences among the object luminances in the plurality of areas.

3. The imaging apparatus according to claim 1, further comprising:
    a setting unit configured to set an imaging sensitivity,
    wherein the setting unit increases an upper limit of the imaging sensitivity to be set when imaging is performed without flashing the illumination device with increasing object distance in the reference area from a predetermined range.

4. The imaging apparatus according to claim 3, wherein the setting unit increases the upper limit of the imaging sensitivity as the flash control unit decreases the threshold value.

5. The imaging apparatus according to claim 1, wherein the reference area is an area where a main object is considered to exist.

6. The imaging apparatus according to claim 1, wherein the reference area is an area where the object distance is the shortest based on the information acquired by the acquisition unit.

7. The imaging apparatus according to claim 1, further comprising:
    a focus detection unit having a plurality of focus detection areas and configured to detect a defocus amount in each of the plurality of focus detection areas, wherein the information acquired by the acquisition unit includes information representing the defocus amount in each of the plurality of focus detection areas detected by the focus detection unit.

8. The imaging apparatus according to claim 7, wherein the reference area is an in-focus area selected from among the plurality of focus detection areas.

9. The imaging apparatus according to claim 7, wherein the flash control unit changes the threshold value without using the object distance in the area, where the defocus amount falls out of a depth of focus determined based on a full aperture value.

10. A method for controlling an imaging apparatus capable of performing imaging using an illumination device, the method comprising:
- acquiring object luminance information;
- acquiring information relating to object distances in a plurality of areas; and
- flashing the illumination device during imaging if a luminance value based on the acquired object luminance information is less than a threshold value,
- changing the threshold value according to an object distance in a reference area and a difference between the object distances in the plurality of areas based on the acquired information,
- decreasing the threshold value with increasing object distance in the reference area from a predetermined range.

* * * * *